United States Patent
Hollingsworth et al.

(10) Patent No.: US 7,131,842 B2
(45) Date of Patent: Nov. 7, 2006

(54) METHODS FOR GENERATING CLASSROOM PRODUCTIVITY INDEX

(76) Inventors: John Hollingsworth, 6651 S. McCall, Fowler, CA (US) 93625; Sylvia Ybarra, 6651 S. McCall, Fowler, CA (US) 93625

( * ) Notice: Subject to any disclaimer, the term of this patent is extended or adjusted under 35 U.S.C. 154(b) by 630 days.

(21) Appl. No.: 10/360,110

(22) Filed: Feb. 7, 2003

(65) Prior Publication Data
US 2004/0157201 A1    Aug. 12, 2004

(51) Int. Cl.
G09B 7/00    (2006.01)
(52) U.S. Cl. ............... 434/323; 434/322; 434/362
(58) Field of Classification Search ............ 434/81, 434/118, 322, 323, 336, 350, 362, 365; 463/40; 705/10; 706/11, 16; 707/104.1; 710/111
See application file for complete search history.

(56) References Cited

U.S. PATENT DOCUMENTS

| | | | |
|---|---|---|---|
| 3,984,923 A | 10/1976 | Rawson et al. | |
| 4,820,167 A | 4/1989 | Nobles et al. | |
| 5,002,491 A * | 3/1991 | Abrahamson et al. | 434/322 |
| 5,788,508 A | 8/1998 | Lee et al. | |
| 5,864,869 A * | 1/1999 | Doak et al. | 707/104.1 |
| 5,978,648 A * | 11/1999 | George et al. | 434/362 |
| 5,987,443 A * | 11/1999 | Nichols et al. | 706/11 |
| 6,064,856 A | 5/2000 | Lee et al. | |
| 6,092,081 A | 7/2000 | Alpert et al. | |
| 6,146,148 A * | 11/2000 | Stuppy | 434/322 |
| 6,149,441 A | 11/2000 | Pellegrino et al. | |
| 6,405,226 B1 | 6/2002 | Alpert et al. | |
| 6,427,063 B1* | 7/2002 | Cook et al. | 434/350 |
| 6,535,861 B1* | 3/2003 | O'Connor et al. | 706/11 |
| 6,652,287 B1* | 11/2003 | Strub et al. | 434/365 |
| 6,688,891 B1* | 2/2004 | Sanford | 434/365 |
| 6,790,045 B1* | 9/2004 | Drimmer | 434/336 |
| 2001/0003099 A1* | 6/2001 | Von Kohorn | 463/40 |
| 2002/0116253 A1* | 8/2002 | Coyne et al. | 705/10 |
| 2002/0120593 A1* | 8/2002 | Iemoto et al. | 705/16 |
| 2003/0129574 A1* | 7/2003 | Ferriol et al. | 434/362 |
| 2004/0009461 A1* | 1/2004 | Snyder et al. | 434/350 |
| 2004/0023191 A1* | 2/2004 | Brown et al. | 434/156 |
| 2004/0076930 A1* | 4/2004 | Steinberg et al. | 434/81 |
| 2004/0117528 A1* | 6/2004 | Beacher et al. | 710/111 |
| 2004/0214152 A1* | 10/2004 | Hoyashita et al. | 434/350 |

FOREIGN PATENT DOCUMENTS

JP    2001175722 A  *  6/2001

* cited by examiner

Primary Examiner—Joe H. Cheng
(74) Attorney, Agent, or Firm—Mark D. Miller

(57) ABSTRACT

Disclosed is a system and method for evaluating educational effectiveness and establishing an index for comparison. The index is called the Classroom Productivity Index and is determined from four factors multiplied together. Two of the factors come from a Curriculum Calibration of student assignments process: (1) Alignment to Standards and (2) Breadth of Coverage. The two other factors come from a School Wide Instructional Practices Summary (classroom observations) process: (3) Time on Task, and (4) Instructional Effectiveness. The Index is used to quantifiably measure the educational institution's overall effectiveness and to identify areas for improvement in the school's instructional processes that will result in improved student learning and improved student achievement on state assessments. A repeat determination of the Classroom Productivity Index at a future time can measure a school's progress, or lack of progress, in improving its educational processes. The usefulness of the Index is based on the premise that improved teaching results in improved student learning.

15 Claims, 28 Drawing Sheets

EXPLICIT DIRECT INSTRUCTION

| COMPONENT | TEACHER | |
|---|---|---|
| PRESENTATION | | |
| ☐ Learning Objectives | States the learning objective in terms of situation and behavioral terms.<br>• Given a map of the United States, the students will be able to label all the states.<br>• Given the Periodic Table of the Elements, the students will be able to create chemical compounds.<br>• Given a short story, the students will be able to identify similes and metaphors.<br>• Given a series of situations, the students will be able to state how the situations are connected to the Constitution.<br>NOTE: Specifies what students will be able to do independently. Describes the independent work. | |
| ☐ Preview or Review | Imparts or activates prior knowledge.<br>• Brainstorms about what students already know about the topic.<br>• Poses questions to be answered.<br>• Scans the content material to see how it is organized.<br>• Looks at the pictures and titles.<br>• Makes inferences: If this... then this...<br>• Selects familiar vocabulary words to trigger their prior knowledge.<br>• Creates questions that will draw on prior knowledge that do not have *yes* or *no* answers.<br>• Makes predictions. | Check for Understanding, Feedback, Cues & Prompts |
| ☐ Explain, Model, Demonstrate | • In Geometry, circumference is the distance around a circle (explaining).<br>• This is the way I remember how to spell photosynthesis. Photosynthesis is a word that has two components: photo and synthesis (modeling).<br>• Now, let us take a look at how we measure circumference. This is a globe. This is a measuring tape, etc. (demonstrating). | |
| ☐ Check for Understanding | • Popsicle sticks.<br>• Calls on two students, then tells a third student to be ready to answer the next question.<br>• Tells one student to call on someone who does not have his hand raised.<br>• Tells the rest of the class to WRITE their answer to the question on paper.<br>• Poses a question and counts to 10 silently before asking one student in the class. | |
| ☐ Guided Practice | • Works problems with students.<br>• Provides many examples and non-examples for students.<br>• Expects high percentage of correct answers (80% for new materials, 95% for review).<br>• Checks for understanding. | ☐ |
| ☐ Closure | This is a time for students to demonstrate what they have learned:<br>• Question and answer.<br>• Discussion.<br>• Explanation by students regarding what they have learned.<br>• Paper-and-pencil activities. | |
| PRACTICE | | |
| ☐ Independent Practice | • Students are to be given independent practice to practice what they have just been taught.<br>• Independent practice is to practice the skill, not to learn the skill.<br>• All components of independent practice must have been taught beforehand. | |
| ☐ Daily Success | • Homework: 10 minutes per grade level; parents as facilitators, not teachers. | • |
| ☐ Periodic Review | • Massed practice (doing all of the same problems).<br>• Distributed Practice (includes prior-taught and newly taught material).<br>• Cumulative review covering several topics to facilitate retention. | • |
| ASSESSMENT AND EVALUATION | | |
| ☐ Mastery | • Effective feedback.<br>• Identify whole class needs.<br>• Identify student for Targeted Interventions. | • |
| ☐ Goal Setting | • Provides opportunities for students to develop their own goals (I will write more compound sentences). | • |
| ☐ Generalize | • Teachers collaborate with each other: content (cause and effect) or same strategies across the school. | |
| MONITORING AND FEEDBACK (Provided throughout the lesson as needed) | | |
| ☐ Cues & Prompts | • Ensure that students continue to be on task. | • |
| ☐ Feedback | • Positive feedback.<br>• Timely corrective feedback. | |

Grade O K O 1 O 2 O 3 O 4 O 5 O 6 O 7 O 8 O 9 O 10 O 11 O 12

School _____  Teacher _____  Student Count _____

Subject O Math  O Language Arts  O Science  O History/SS  O ELD  O Other _____

Date __/__/__   Time __:__

① Presentation
- O Video
- O Other _____
- O Objectives Stated
- O Review
- O Explanation
- O Modeling
- O Disconnected Lesson
- O Demonstration
- O Check for Understanding
- O Closure

Monitoring & Feedback (On Task)
- O Cues & Prompts
- O Guided Practice
- O Corrective Feedback
- O Periodic Review

Practice
- O Daily success
- O Mastery
- O Goal setting
- O Generalization

Assessment & Evaluation

Students working independently: (Off Task)
- O while teacher is occupied with other activities.
- O while teacher walks around or works with groups.
- O doing work unrelated to instruction.
- O passive activity (SSR, Video, etc.).

Management & Admin. Tasks _____  Transitions _____
Bird Walking _____  Other _____

Off Task Subtotal _____  Total Minutes _____

②
Enhancers to Learning
- O Teacher interacts with students
- O Students follow instructions
- O Students raise their hand
- O Most students answer questions
- O Routines & Procedures
- O Other

Distractors to Learning
- O Students are distracted
- O Students bother each other
- O Students are non-responsive
- O Only few students are involved
- O Telephone ringing
- O Announcements being made
- O Personnel In/Out
- O Other

Students Working
- O Cooperative groups
- O Pair/group discussions
- O Whole class

Aides/Volunteers Working With:
- O Groups  O One student
- O Pairs   O Administrative

Student Aides Working With:
- O Groups  O One student
- O Pairs   O Administrative

③ What type of questions teacher is asking?
- Knowledge List, define, identify, recall, name, recognize
- Comprehension Predict, interpret, explain, summarize, estimate, evaluate
- Application Demonstrate, explain, solve, calculate, identify, infer, use, apply
- Analysis Distinguish, discriminate, categorize, outline, identify, separate
- Synthesis Create, design, organize, derive, formulate, compose, write
- Evaluation Criticize, examine, judge, compare, contrast, conclude, critique

Response Wait Time  O 1-2 Sec.  O 3-5 Sec.  O Over 5 Sec.

④ (Cognitive Strategies)
ELL O SDAIE/Sheltered

Language Objectives
O Write  O Read  O Speak  O List

Supplementary Materials
- O Manipulatives  O Realia
- O Visuals/pictures  O Multimedia
- O Related literature  O Adapted text

Adaptations of Content
- O Study guides  O Outlines
- O Taped text  O Highlighted text
- O Other  O Jigsaw reading

Comprehensible Input
Speech Rate O Slow  O Fast
Sentences O Simple  O Complex
Clear Academic Tasks
O Step by step  O Visual Presentation

Variety of Techniques
- O Gestures  O Read comp
- O Hands on  O Writing
- O Scaffolding  O Questioning
- O Voc development

Groups
O Homogeneous  O Heterogeneous

⑤
Basic Tasks
Rehearsal O Reciting list

Elaboration O Mnemonics

Organizational O Clustering

Teaching Strategy O _____

Complex Tasks
- O Copying material  O Underlining text
- O Verbatim note taking
- O Paraphrasing  O Creating analogies
- O Summarizing  O Answering questions
- O Note making
- O Selecting main idea  O Outlining
- O Graphic organizers  O Mapping Make a tally _____  Total _____

Print neatly in the scan boxes (Upper Case)

Fill Circles Like This: ●  Not Like This: ⊗ or ⊘

(C) Silvia Ybarra, Ed.D. & John Hollingsworth

7972218679  Version 4  Page 1 of 2

Classroom Observation

Figure 4

ILLUMINATI UNIFIED SCHOOL DISTRICT
BIG BEN MS
Percentage of Student Assignments Aligned to California Standards English Language Arts (by Class Type)

| | | | Multiple Levels | Unrelated to Standards | 00 | 01 | 02 | 03 | 04 | 05 | 06 | 07 | 08 | 09-10 | 11-12 | Total |
|---|---|---|---|---|---|---|---|---|---|---|---|---|---|---|---|---|
| Regular ED | Grade | 06 CORE 2 | | | | | | 23% | 3% | 8% | 68% | | | | | 100% |
| | | 06 CORE 5 | | | | | | | 22% | 22% | 56% | | | | | 100% |
| | | 06 Humanities 6 | | | | | | 100% | | | | | | | | 100% |
| | | 07 Humanities | | | | | | | | | 56% | 44% | | | | 100% |
| | | 08 Humanities | | | | | | | | | 100% | | | | | 100% |
| | | CORE 1 | | | | | | | 25% | 25% | 17% | 25% | 8% | | | 100% |
| | | CORE 2 | | | | | | | 16% | 32% | 16% | 28% | 8% | | | 100% |
| | | CORE 3 | | | | | | | | | 100% | | | | | 100% |
| | | CORE 4 | | | | | 20% | 49% | 6% | 6% | 12% | 6% | | | | 100% |
| | | CORE 5 | | | | | | 36% | 57% | | | 7% | | | | 100% |
| | | CORE 6 | | | | | | 21% | | | 79% | | | | | 100% |
| ELD | Grade | ELL 1 ELD | | | | | | 67% | | | 33% | | | | | 100% |
| | | ELL 2 ELD | | 7% | | 7% | 15% | 37% | 20% | 7% | 7% | | | | | 100% |
| | | ELL 3 ELD | | | | | | 18% | 18% | 27% | 27% | 9% | | | | 100% |
| Special ED | Grade | SDC | | | | | 33% | 33% | 8% | 8% | 17% | | | | | 100% |

Actual Total of Percentages may vary due to rounding of individual values.

Figure 6

ILLUMINATI UNIFIED SCHOOL DISTRICT
BIG BEN MS
Percentage of Assignments by Type of Class, Grade, Subject Strand & Topic
Mathematics (by Grade)

| | | | Mathematics Strands | | | | | | | | |
|---|---|---|---|---|---|---|---|---|---|---|---|
| | | | Math Multiple Levels | Math Unrelated to Standards | Number Sense Strand | Alg & Functions Strand | Meas & Geom Strand | Stat, DA & Prob Strand | Math Reasoning Strand | Algebra I Course | Geometry Course | Total |
| Regular ED | Grade | 06 | | | 100% | | | | | | | 100% |
| | | 07 | | | 100% | | | | | | | 100% |
| | | Pre-Algebra | | | 13% | 74% | | 11% | | 3% | | 100% |
| | | Algebra I | | | 3% | 18% | | | 2% | 72% | 5% | 100% |
| | | MATH 1-6-7 | | | 100% | | | | | | | 100% |
| | Total | | | | 46% | 31% | | 4% | 0% | 17% | 1% | 100% |
| ELD | Grade | MATH 2 | | | | 100% | | | | | | 100% |
| | Total | | | | | 100% | | | | | | 100% |
| Special ED | Grade | 06 | | | 100% | | | | | | | 100% |
| | Total | | | | 100% | | | | | | | 100% |

Figure 7

| Classroom Productivity Index (CPI) | | |
| --- | --- | --- |
| | Observed | Optimum |
| 1. Alignment to Standards | 80% | 90% |
| 2. Breadth of Curriculum | 57% | 90% |
| 3 Time on Task | 81% | 95% |
| 4. Instructional Effectiveness | 51% | 90% |
| CPI | 19% | 69% |

1. Alignment to Standards is the overall percentage of student assignments that are on grade level as measured against the state content standards. It was determined by analyzing student work (Curriculum Calibration).

2. Breadth of Curriculum measures the alignment of the percentage of assignments given to students in each content strand as compared to percentage of questions assessed in each content strand on state assessments. It was determined by analyzing collected student work (Curriculum Calibration).

3. Time on Task is the percent of the classtime in which students are actually engaged in curriculum-related activities. It was determined from classroom observations (School Wide Instructional Practices Summary).

4. Instructional Effectiveness measures the percentage of teachers that were substantially using components of Explicit Direct Instruction. It was determined from classroom observations (School Wide Instructional Practices Summary).

CPI School Wide Improvement Potential (69/19) = 363%

Improvement Potential is the potential improvement in classroom productivity that can be obtained by optimizing all four components of the CPI.

116 South Seventh Street
Fowler, CA 93625
(559) 834-2449
(559) 834-4500 FAX
staff@dataworks-ed.com

EDUCATIONAL RESEARCH

Curriculum Calibration Instructions

Student work at this school is going to be collected and analyzed for alignment to the State Content Standards. Teachers will, therefore, collect and turn in to the office all student work for 3 selected students for the collection period shown below. Please submit work that was produced during the collection period only.

It is important that every single piece of work for the 3 students, whether completed or not, be collected. Failing to collect all work or picking and choosing examples produces a sub-sample that is not a valid representation of the students' work.

- Teachers select their own 3 students for the analysis. They should be 1 high-performing, 1 medium-performing, and 1 low-performing student. Work is collected for these 3 students only.
- A manila folder or envelope will be provided for each student to hold the work.
- Labels will be provided to identify each folder or envelope with the student's name, school, teacher, type of class (regular, remedial, advanced, etc.), grade, and indication of high, medium, or low performing student. Please fill in this information carefully so accurate results will be produced.
- Teachers will collect all student work except for bulky items such as art projects, science projects, etc.
- As much of the work as possible should be graded by the teacher. If a non-standard grading method is used, please indicate which mark represents above average, average, and below average work.
- Each assignment must be marked to indicate the type of work as follows:

H    for homework              A    for work done with an instructional aide or a volunteer
    TG   for teacher guided classwork  G    for work done in groups or pairs
    I    for independent classwork  Q    quizzes or tests

- Each assignment must be marked to indicate the source of the worksheet as follows:

TC   teacher created            D    district created
    C    commercial worksheet       INT  internet
    TXT  textbook School _____.

Student work will be collected _____.

Student work must be turned in to the office by _____.

Figure 10

ILLUMINATI UNIFIED SCHOOL DISTRICT
BIG BEN MS - Dec 02
Number of Assignments by Grade & Subject Area

| Grade | | Subject Area | | | | Total |
|---|---|---|---|---|---|---|
| | | English Language Arts | Mathematics | Science | Social Studies | |
| | 06 CORE 2 | 40 | | | 12 | 52 |
| | 06 CORE 5 | 9 | | | | 9 |
| | 06 Humanities 6 | 3 | | | | 3 |
| | 06 MATH 6 | | 87 | | | 87 |
| | 06 MATH Intervention | | 7 | | | 7 |
| | 06 SDC | | 9 | | | 9 |
| | 06 Science 3 | | | 4 | | 4 |
| | 06 Science 6 | | | 12 | | 12 |
| | 07 Humanities | 27 | | | | 27 |
| | 07 MATH Intervention | | 3 | | | 3 |
| | 07 Science 4 | | | 2 | | 2 |
| | 07 Science 5 | | | 3 | | 3 |
| | 08 Humanities | 8 | | | | 8 |
| | 08 Science 2 SDC | | | 8 | | 8 |
| | Algebra I | | 60 | | | 60 |
| | CORE 1 | 12 | | | | 12 |
| | CORE 2 | 25 | | | | 25 |
| | CORE 3 | 6 | | | | 6 |
| | CORE 4 | 49 | | | 3 | 52 |
| | CORE 5 | 14 | | | 5 | 19 |
| | CORE 6 | 19 | | | | 19 |

ILLUMINATI UNIFIED SCHOOL DISTRICT
BIG BEN MS - Dec 02

Number of Assignments by Grade & Subject Area (cont.)

| Grade | | Subject Area | | | | Total |
|---|---|---|---|---|---|---|
| | | English Language Arts | Mathematics | Science | Social Studies | |
| | ELL 1 ELD | 9 | | | 4 | 13 |
| | ELL 2 ELD | 41 | | | | 41 |
| | ELL 3 ELD | 11 | | | 2 | 13 |
| | MATH 1-6-7 | | 11 | | | 11 |
| | MATH 2 ELD | | 16 | | | 16 |
| | Pre-Algebra | | 81 | | | 81 |
| | Pre-Algebra Combo (06-08) | | 14 | | | 14 |
| | SDC | 24 | | | | 24 |
| | Science 2 | | | 17 | | 17 |
| | Science 3 | | | 6 | | 6 |
| | Science 4 | | | 19 | | 19 |
| | Science 5 | | | 17 | | 17 |
| Total | | 297 | 288 | 88 | 26 | 699 |

Figure 12

ILLUMINATI UNIFIED SCHOOL DISTRICT
BIG BEN MS - Dec 02
Percentage of Student Assignments Aligned to California Standards English Language Arts (by Class Type)

| | | | Multiple Levels | Unrelated to Standards | 00 | 01 | 02 | 03 | 04 | 05 | 06 | 07 | 08 | 09-10 | 11-12 | Total |
|---|---|---|---|---|---|---|---|---|---|---|---|---|---|---|---|---|
| Regular ED | Grade | 06 CORE 2 | | | | | | 23% | 3% | 8% | 68% | | | | | 100% |
| | | 06 CORE 5 | | | | | | | 22% | 22% | 56% | | | | | 100% |
| | | 06 Humanities 6 | | | | | | 100% | | | | | | | | 100% |
| | | 07 Humanities | | | | | | | | | 56% | 44% | | | | 100% |
| | | 08 Humanities | | | | | | | | | 100% | | | | | 100% |
| | | CORE 1 | | | | | | | 25% | 25% | 17% | 25% | | | | 100% |
| | | CORE 2 | | | | | | | 16% | 32% | 16% | 28% | | | | 100% |
| | | CORE 3 | | | | | | | | | 100% | | | | | 100% |
| | | CORE 4 | | | | | 20% | 49% | 6% | 6% | 12% | 6% | | | | 100% |
| | | CORE 5 | | | | | | 36% | 57% | | | 7% | | | | 100% |
| | | CORE 6 | | | | | | 21% | | | 79% | | | | | 100% |
| ELD | Grade | ELL 1 ELD | | | | | | 67% | | | 33% | | | | | 100% |
| | | ELL 2 ELD | | 7% | 7% | 15% | 37% | 20% | 7% | 7% | | | | | 100% |
| | | ELL 3 ELD | | | | | 18% | 18% | 27% | 27% | 9% | | | | 100% |
| Special ED | Grade | SDC | | | | | 33% | 33% | 8% | 8% | 17% | | | | | 100% |

Actual Total of Percentages may vary due to rounding of individual values.

Figure 13

ILLUMINATI UNIFIED SCHOOL DISTRICT
BIG BEN MS - Dec 02
Percentage of Assignments by Type of Class, Grade, Subject Strand & Topic
English Language Arts (by Grade)

| | | | English Language Arts Strands | | | | | | | | | | |
|---|---|---|---|---|---|---|---|---|---|---|---|---|---|
| | | | Language Arts Multiple Levels | Language Arts Unrelated to Standards | Read 1.0 (Vocabulary) | Read 2.0 (Comprehension) | Read 3.0 (Literary Analysis) | Write 1.0 (Strategies) | Write 2.0 (Applications) | Conventions 1.0 (Grammar) | Listen & Speak 1.0 (Strategies) | Listen & Speak 2.0 (Applications) | Total |
| Regular ED | Grade | 06 | | | 33% | 19% | | 37% | | | | | 100% |
| | | 07 | | | | | | 56% | 44% | | | | 100% |
| | | 08 | | | | | | 75% | 25% | | | | 100% |
| | | CORE 1 | | | 25% | 33% | 8% | 17% | 8% | 8% | | | 100% |
| | | CORE 2 | | | 36% | 32% | 8% | 8% | 8% | 8% | | | 100% |
| | | CORE 3 | | | | 50% | | 50% | | | | | 100% |
| | | CORE 4 | | | 6% | 6% | | 24% | 4% | 59% | | | 100% |
| | | CORE 5 | | | 14% | 7% | 7% | 21% | | 50% | | | 100% |
| | | CORE 6 | | | | 11% | | 79% | | | 11% | | 100% |
| | Total | | | | 16% | 15% | 2% | 36% | 12% | 18% | 1% | | 100% |
| ELD | Grade | ELL 1 | | | | 33% | | 33% | | 33% | | | 100% |
| | | ELL 2 | | 7% | 7% | 32% | | 41% | | 12% | | | 100% |
| | | ELL 3 | | | 27% | 36% | 9% | 27% | | 13% | | | 100% |
| | Total | | | 5% | 10% | 33% | 2% | 38% | | 13% | | | 100% |
| Special ED | Grade | SDC | | | 38% | 4% | 4% | 8% | | 46% | | | 100% |
| | Total | | | | 38% | 4% | 4% | 8% | | 46% | | | 100% |

Figure 15

ILLUMINATI UNIFIED SCHOOL DISTRICT
BIG BEN MS - Dec 02

Percentage of Assignments - Grade by Type of Work

English Language Arts (by Grade) (Coded Assignments Only)

| | | | | Type of Work | | | | | | |
|---|---|---|---|---|---|---|---|---|---|---|
| | | | Homework | Teacher Guided | Independent | Aide | Group | Quiz/Test | Family Involvement | Total |
| Regular ED | Grade | 06 | 42% | 4% | 19% | | 23% | 12% | | 100% |
| | | 07 | | 67% | | | | 33% | | 100% |
| | | CORE 1 | 17% | 25% | 42% | | | 17% | | 100% |
| | | CORE 2 | 16% | 36% | 32% | | | 16% | | 100% |
| | | CORE 4 | 16% | 42% | | | | 42% | | 100% |
| | | CORE 5 | 8% | 75% | 17% | | | | | 100% |
| | | CORE 6 | 18% | 18% | 29% | | 35% | | | 100% |
| | Total | | 20% | 33% | 21% | | 10% | 17% | | 100% |
| ELD | Grade | ELL 1 | | | 100% | | | | | 100% |
| | | ELL 2 | 32% | 28% | 12% | | 16% | 12% | | 100% |
| | | ELL 3 | 14% | 14% | 57% | | 14% | | | 100% |
| | Total | | 23% | 21% | 36% | | 13% | 8% | | 100% |
| Special ED | Grade | SDC | | 30% | 70% | | | | | 100% |
| | Total | | | 30% | 70% | | | | | 100% |

Figure 16

ILLUMINATI UNIFIED SCHOOL DISTRICT
BIG BEN MS - Dec 02
Percentage of Assignments - Grade by Source of Work English Language Arts (by Grade)

| | | | | Source of Work | | | | | |
|---|---|---|---|---|---|---|---|---|---|
| | | | Teacher | Commercial | Textbook | District | Internet | Other | School | Total |
| Regular ED | Grade | 06 | 67% | 33% | | | | | | 100% |
| | | 07 | 100% | | | | | | | 100% |
| | | 08 | 63% | 38% | | | | | | 100% |
| | | CORE 1 | 67% | | 33% | | | | | 100% |
| | | CORE 2 | 76% | | 24% | | | | | 100% |
| | | CORE 3 | 100% | | | | | | | 100% |
| | | CORE 4 | 65% | 12% | 22% | | | | | 100% |
| | | CORE 5 | 36% | 50% | 14% | | | | | 100% |
| | | CORE 6 | 89% | 11% | | | | | | 100% |
| | Total | | 73% | 17% | 11% | | | | | 100% |
| ELD | Grade | ELL 1 | 100% | | | | | | | 100% |
| | | ELL 2 | 93% | 7% | | | | | | 100% |
| | | ELL 3 | 100% | | | | | | | 100% |
| | Total | | 95% | 5% | | | | | | 100% |
| Special ED | Grade | SDC | 17% | 83% | | | | | | 100% |
| | Total | | 17% | 83% | | | | | | 100% |

Figure 17

ILLUMINATI UNIFIED SCHOOL DISTRICT
BIG BEN MS - Dec 02
Percentage of Student Assignments Aligned to California Standards Mathematics (by Class Type)

| | | | Multiple Levels | Unrelated to Standards | 00 | 01 | 02 | 03 | 04 | 05 | 06 | 07 | 08 | 09 | 10 | 11 | 12 | Algebra I | Geometry | Total |
|---|---|---|---|---|---|---|---|---|---|---|---|---|---|---|---|---|---|---|---|---|
| Regular ED | Grade | 06 MATH 6 | | | | | | 1% | 13% | 7% | 79% | | | | | | | | | 100% |
| | | 06 MATH Intervention | | | | | | | | | 100% | | | | | | | | | 100% |
| | | 07 MATH Intervention | | | | | | | | | 100% | 17% | | | | | | | | 100% |
| | | Algebra I | | | | | | | | 2% | 5% | | | | | | | 72% | 5% | 100% |
| | | MATH 1-6-7 | | | | | | | | | 100% | | | | | | | | | 100% |
| | | Pre-Algebra | | | | | | | | 16% | 31% | 49% | | | | | | 4% | | 100% |
| | | Pre-Algebra Combo (06-08) | | | | | | | | 7% | 29% | 64% | | | | | | | | 100% |
| ELD | Grade | MATH 2 ELD | | | | | | | | 19% | 81% | | | | | | | | | 100% |
| Special ED | Grade | 06 SDC | | | | | | | | 100% | | | | | | | | | | 100% |

Grade-Level Per California Standards.

Actual Total of Percentages may vary due to rounding of individual values.

Figure 18

ILLUMINATI UNIFIED SCHOOL DISTRICT
BIG BEN MS - Dec 02

Percentage of Assignments by Type of Class, Grade, Subject Strand & Topic

Mathematics (by Grade)

| | | | Mathematics Strands | | | | | | | | | Total |
|---|---|---|---|---|---|---|---|---|---|---|---|---|
| | | | Math Multiple Levels | Math Unrelated to Standards | Number Sense Strand | Alg & Functions Strand | Meas & Geom Strand | Stat, DA & Prob Strand | Math Reasoning Strand | Algebra I Course | Geometry Course | |
| Regular ED | Grade | 06 | | | 100% | | | | | | | 100% |
| | | 07 | | | 100% | | | | | | | 100% |
| | | Pre-Algebra | | | 13% | 74% | | 11% | | 3% | | 100% |
| | | Algebra I | | | 3% | 18% | | | 2% | 72% | 5% | 100% |
| | | MATH 1-6-7 | | | 100% | | | | | | | 100% |
| | Total | | | | 46% | 31% | | 4% | 0% | 17% | 1% | 100% |
| ELD | Grade | MATH 2 | | | | 100% | | | | | | 100% |
| | Total | | | | | 100% | | | | | | 100% |
| Special ED | Grade | 06 | | | 100% | | | | | | | 100% |
| | Total | | | | 100% | | | | | | | 100% |

Figure 20

ILLUMINATI UNIFIED SCHOOL DISTRICT
BIG BEN MS - Dec 02
Percentage of Assignments - Grade by Type of Work Mathematics (by Grade) (Coded Assignments Only)

| | | | | | Type of Work | | | | | |
|---|---|---|---|---|---|---|---|---|---|---|
| | | | | Homework | Teacher Guided | Independent | Aide | Group | Quiz/Test | Family Involvement | Total |
| Regular ED | Grade | 06 | | 55% | 12% | 8% | | | 25% | | 100% |
| | | 07 | | 100% | | | | | | | 100% |
| | | Pre-Algebra | | 36% | 33% | 6% | | | 25% | | 100% |
| | | Algebra I | | 61% | 25% | 2% | | | 12% | | 100% |
| | | MATH 1-6-7 | | 73% | | 27% | | | | | 100% |
| | Total | | | 50% | 23% | 7% | | | 20% | | 100% |
| ELD | Grade | MATH 2 | | 44% | 13% | | | | 56% | | 100% |
| | Total | | | 44% | 13% | | | | 56% | | 100% |
| Special ED | Grade | 06 | | 25% | | 25% | 38% | | | | 100% |
| | Total | | | 25% | | 25% | 38% | | | | 100% |

Figure 21

ILLUMINATI UNIFIED SCHOOL DISTRICT
BIG BEN MS - Dec 02
Percentage of Assignments - Grade by Source of Work Mathematics (by Grade)

| | | | | Source of Work | | | | | |
|---|---|---|---|---|---|---|---|---|---|
| | | | Teacher | Commercial | Textbook | District | Internet | Other | School | Total |
| Regular ED | Grade | 06 | 20% | 31% | 46% | 3% | | | | 100% |
| | | 07 | | 100% | | | | | | 100% |
| | | Pre-Algebra | 33% | | 67% | | | | | 100% |
| | | Algebra I | 20% | | 80% | | | | | 100% |
| | | MATH 1-6-7 | | 100% | | | | | | 100% |
| | Total | | 24% | 16% | 59% | 1% | | | | 100% |
| ELD | Grade | MATH 2 | | | 100% | | | | | 100% |
| | Total | | | | 100% | | | | | 100% |
| Special ED | Grade | 06 | | 78% | 22% | | | | | 100% |
| | Total | | | 78% | 22% | | | | | 100% |

Figure 22

ILLUMINATI UNIFIED SCHOOL DISTRICT
BIG BEN MS - Dec 02
Percentage of Student Assignments Aligned to California Standards Science (by Class Type)

| | | | Multiple Levels | Unrelated to Standards | 00 | 01 | 02 | 03 | 04 | 05 | 06 | 07 | 08 | 09 | 10 | 11 | 12 | Earth Science | Total |
|---|---|---|---|---|---|---|---|---|---|---|---|---|---|---|---|---|---|---|---|
| Regular ED | Grade | 06 Science 3 | | | | | | | | | 25% | | 75% | | | | | | 100% |
| | | 06 Science 6 | | | | | | | | | 100% | | | | | | | | 100% |
| | | 07 Science 4 | | | | | | | | | | | 100% | | | | | | 100% |
| | | 07 Science 5 | | 12% | | | | | | | 33% | | 67% | | | | | | 100% |
| | | Science 2 | | 50% | | | | | | 24% | 53% | | 12% | | | | | | 100% |
| | | Science 3 | | 53% | | | | | | | | | 50% | | | | | | 100% |
| | | Science 4 | | 12% | | | | | | | 12% | 53% | 47% | | | | | 24% | 100% |
| Special ED | Grade | 08 Science 2 SDC | | | | | | | | | 100% | | | | | | | | 100% |

Actual Total of Percentages may vary due to rounding of individual values.

Grade-Level Per California Standards.

Figure 23

ILLUMINATI UNIFIED SCHOOL DISTRICT
BIG BEN MS - Dec 02
Percentage of Assignments - Grade by Type of Work Science (by Grade) (Coded Assignments Only)

| | | | | Type of Work | | | | | | |
|---|---|---|---|---|---|---|---|---|---|---|
| | | | Homework | Teacher Guided | Independent | Aide | Group | Quiz/Test | Family Involvement | Total |
| Regular ED | Grade | 06 | 56% | 25% | 13% | | 6% | | | 100% |
| | | 07 | | 20% | 40% | | 40% | | | 100% |
| | | Science 2 | | 24% | 35% | | 41% | | | 100% |
| | | Science 3 | 100% | | | | | | | 100% |
| | | Science 4 | | 33% | 67% | | | | | 100% |
| | | Science 5 | | 100% | | | | | | 100% |
| | Total | | 21% | 34% | 28% | | 17% | | | 100% |
| Special ED | Grade | 08 | | 100% | | | | | | 100% |
| | Total | | | 100% | | | | | | 100% |

Percentage of Assignments - Grade by Source of Work

Science (by Grade)

| | | | Source of Work | | | | | | | |
|---|---|---|---|---|---|---|---|---|---|---|
| | | | Teacher | Commercial | Textbook | District | Internet | Other | School | Total |
| Regular ED | Grade | 06 | 69% | | 31% | | | | | 100% |
| | | 07 | 60% | | 40% | | | | | 100% |
| | | Science 2 | 59% | 18% | 12% | | 12% | | | 100% |
| | | Science 3 | 100% | | | | | | | 100% |
| | | Science 4 | 63% | | 37% | | | | | 100% |
| | | Science 5 | 82% | | 18% | | | | | 100% |
| | Total | | 70% | 4% | 24% | | 3% | | | 100% |
| Special ED | Grade | 08 | | 100% | | | | | | 100% |
| | Total | | | 100% | | | | | | 100% |

Figure 24

ILLUMINATI UNIFIED SCHOOL DISTRICT
BIG BEN MS - Dec 02
Percentage of Student Assignments Aligned to California Standards

Social Studies (by Class Type)

| | | | Multiple Levels | Unrelated to Standards | 00 | 01 | 02 | 03 | 04 | 05 | 06 | 07 | 08 | 09 | 10 | 11 | 12 | Total |
|---|---|---|---|---|---|---|---|---|---|---|---|---|---|---|---|---|---|---|
| | | | | | | | | | Grade-Level Per California Standards | | | | | | | | | |
| Regular ED | Grade | 06 CORE 2 | | | | | | | | 25% | 75% | | | | | | | 100% |
| | | CORE 4 | | 100% | | | | | | | | | | | | | | 100% |
| | | CORE 5 | | 100% | | | | | | | | | | | | | | 100% |
| ELD | Grade | ELL 1 ELD | | | | | | | | 100% | | | | | | | | | 100% |
| | | ELL 3 ELD | | | | | | | | 50% | | | 50% | | | | | | 100% |

Actual Total of Percentages may vary due to rounding of individual values.

Figure 25

ILLUMINATI UNIFIED SCHOOL DISTRICT
BIG BEN MS - Dec 02
Percentage of Assignments - Grade by Type of Work Social Studies (by Grade) (Coded Assignments Only)

| | | | Type of Work | | | | | | |
|---|---|---|---|---|---|---|---|---|---|
| | | Homework | Teacher Guided | Independent | Aide | Group | Quiz/Test | Family Involvement | Total |
| Regular ED | 06 | 25% | 50% | | | 25% | | | 100% |
| | CORE 4 | | | | | | 100% | | 100% |
| | CORE 5 | | 40% | | | | 60% | | 100% |
| | Total | 15% | 40% | | | 15% | 30% | | 100% |
| ELD | ELL 1 | | 100% | | | | | | 100% |
| | ELL 3 | 100% | | | | | | | 100% |
| | Total | 33% | 67% | | | | | | 100% |

Percentage of Assignments - Grade by Source of Work

Social Studies (by Grade)

| | | Source of Work | | | | | | | |
|---|---|---|---|---|---|---|---|---|---|
| | | Teacher | Commercial | Textbook | District | Internet | Other | School | Total |
| Regular ED | 06 | 25% | 50% | 25% | | | | | 100% |
| | CORE 4 | 100% | | | | | | | 100% |
| | CORE 5 | 60% | 40% | | | | | | 100% |
| | Total | 45% | 40% | 15% | | | | | 100% |
| ELD | ELL 1 | 50% | | 50% | | | | | 100% |
| | ELL 3 | 100% | | | | | | | 100% |
| | Total | 67% | | 33% | | | | | 100% |

Figure 26

ILLUMINATI UNIFIED SCHOOL DISTRICT
BIG BEN MS - Dec 02

Percentage of Student Work in Subject Area by Grade given in Assignments

Student Level (Graded Sheets Only)

| Student | | | English Language Arts | Mathematics | Science | Social Studies | Total |
|---|---|---|---|---|---|---|---|
| High Level Student | Grade | A/B | 95% | 81% | 100% | 100% | 89% |
| | | C | | 10% | | | 5% |
| | | D/F | 5% | 10% | | | 7% |
| | Total | | 100% | 100% | 100% | 100% | 100% |
| Medium Level Student | Grade | A/B | 84% | 49% | 100% | 67% | 67% |
| | | C | 13% | 14% | | | 12% |
| | | D/F | 3% | 37% | | 33% | 21% |
| | Total | | 100% | 100% | 100% | 100% | 100% |
| Low Level Student | Grade | A/B | 24% | 32% | 83% | | 36% |
| | | C | 48% | 4% | | 67% | 18% |
| | | D/F | 28% | 64% | 17% | 33% | 46% |
| | Total | | 100% | 100% | 100% | 100% | 100% |

Figure 27

ILLUMINATI UNIFIED SCHOOL DISTRICT
BIG BEN MS - Dec 02

Percentage of Graded Assignments by Subject Area

Student Level

| | | Subject Area | | | | |
|---|---|---|---|---|---|---|
| | | English Language Arts | Mathematics | Science | Social Studies | Total |
| | Graded | 29% | 46% | 33% | 17% | 36% |
| | Not Graded | 71% | 54% | 67% | 83% | 64% |
| Total | | 100% | 100% | 100% | 100% | 100% |

Figure 28

METHODS FOR GENERATING CLASSROOM PRODUCTIVITY INDEX

BACKGROUND OF THE INVENTION

1. Field of the Invention

The present invention relates to improving classroom instruction for the goal of improving student performance, and more particularly to a system and method for evaluating an educational institution's effectiveness and establishing an index for comparison.

2. Description of the Prior Art

In the field of education, it is a primary objective of educators and administrators of grades K–12 to raise the level of student achievement overall and to narrow the persistent significant achievement gap between high performing students, generally coming from middle and upper socio-economic status families, and lower performing students, generally coming from lower socio-economic status minority families (the "SES performance gap"). Much effort has been spent to analyze the SES performance gap with some researchers/experts attempting to use correlational studies to prove an unbreakable cause-and-effect link between SES and academic achievement. Other researchers, while acknowledging the strong correlation between SES and student performance, have claimed that the correlation can be mitigated through alignment of curriculum and assessment along with effective classroom teaching. Still other researchers have used data to support the assertion that the relationship between effective instruction and student performance is stronger and more predictive than SES.

Ignoring the potential SES link to student achievement or the data concerning the effectiveness of curriculum alignment and quality instruction, educators and administrators have historically relied on information about student achievement as the sole measure of the value of their institutions. In the past, for example, many schools, school districts, and states have used mean student scores from nationally-normed standardized tests to establish ratings/rankings for schools and/or districts such as "high-performing," "low-performing," "program improvement," "blue ribbon," etc. Because of the persistent SES performance gap, a system of multiple measures was developed. Recently the State of California developed a complex "Academic Performance Index" using, again, student achievement data solely as the basis for rewards and punishment given out in recognition of quality schools and/or districts. Given the data concerning factors that contribute to or possibly cause high or low student performance, the incentives and disincentives given out to schools based upon student performance alone are inappropriate. For example, districts create schools for gifted students by moving the highest performing students from many schools onto one campus. State testing then shows these schools to be the highest performing in the state, and they receive awards based on the students' high test scores. Teachers from low performing schools may even come over to observe the teaching mistakenly thinking that the high test scores are a direct result of exceptional teaching.

Efforts have not been made to quantify in measurable terms a school's educational processes. There are some who believe that the state departments of education should expand their efforts to include such measures. Sanctions and rewards could then be then be given based on the quality of the schools' instructional programs.

For the first time, the Classroom Productivity Index provides an unbiased, non-judgmental method to calculate the effectiveness of a school's educational program. There are, in fact, some educators who believe that schools should receive awards and sanctions based only on their educational effectiveness instead of their students' achievement on state tests.

It is therefore highly desirable to provide a method by which educators and administrators can objectively evaluate the quality of their educational program that will be minimally distorted by the quality of the students it serves and to identify particular areas where changes may be made to improve.

U.S. Pat. Nos. 6,092,081 and 6,405,226 describe an interactive teacher and workstation computer environment where the teacher can mark student work with a tag or goal. The goal may be taken from a standardized list so that the work of all students is evaluated using the same criteria. Different weights may be given to different criteria for use in the analysis, and summary reports can be generated. However, while these patents describe some basic data collection, comparison and reporting, they do not provide any direct analysis of teaching effectiveness as they focus on students' test scores. They use test scores to identify areas in which students need additional teaching. These patents do not attempt to measure nor quantify, especially for the purposes of instructional improvement, key educational processes themselves such as time on task, alignment of teacher assignments to grade-level state content standards, coverage of the breadth and depth of the content standards, and effectiveness of classroom instructional practices.

It is therefore desirable to provide a mathematical model of calculating classroom productivity so that schools can focus their efforts on improving their own instructional effectiveness, which is the foundation of improved student learning that, in turn, produces higher student test scores.

SUMMARY OF THE INVENTION

The present invention addresses the above-described problems by providing a system and method for evaluating the effectiveness of a school's educational processes and establishing an index for comparison. Four factors are multiplied together to obtain the index. Two of the factors come from an analysis of student work: (1) Alignment of Student Assignments to State Content Standards, and (2) Breadth Of Coverage of the State Standards; and two other factors come from classroom observations: (3) Time on Task, and (4) Instructional Effectiveness. The Classroom Productivity Index is the product of these four factors. The Index can be used in comparative analysis to determine the relative quality of the education presented to students at various schools, and it provides a standard by which educators and administrators may objectively evaluate the effectiveness of a school's educational capability while, at the same time, identifying instructional processes that need improvement.

The first factor, Alignment to State Content Standards, is the percentage of work where the assigned task meets the grade-level objective of the standards, irrespective of student performance. The second factor, Breadth of Coverage, is the percentage of work that meets the distribution of questions in topic areas as assessed on some objective measure, typically statelevel standardized tests.

The process of collecting and aligning student work to standards is called Curriculum Calibration and provides two components of the Classroom Productivity Index: (1) Alignment to Standards and (2) Breadth of Coverage of the Standards.

Information for the other two factors, (3) Time on Task and (4) Instructional Effectiveness, are determined from information collected by specially trained observers who visit classrooms for one hour each and record student and teacher behaviors. The percentage of time that students are effectively engaged in learning is the Time On Task, and specific teacher behaviors as described in the Explicit Direct Instruction Model (see FIG. 1) are used in determining Instructional Effectiveness. The information gained from the classroom observations is summarized and processed into a completed report called a School Wide Instructional Practices Summary (SWIPS).

After computer analysis of the data, each of the four Index components is converted into a number between zero and one. The Classroom Productivity Index is then calculated as the products of the four components.

There are a few variations in the invention. In one variation, the amount of student work collected is reduced. Instead of collecting and analyzing assignments from all students, a sub-sample of three to six students per teacher is used. Experience has shown no loss of accuracy since all students are essentially being given the same worksheets and assignments.

In another variation, student work collections and classroom observations are made in only selected content areas, usually language arts and math. This is often done where state testing focuses in these two areas. When states test students in other content areas such as science and social science, the student work collection and classroom observations are expanded to include these content areas.

The Classroom Productivity Index is useful because it is measuring instructional processes. This is a radical change from the often ever-expanding measuring and testing of students. In fact, it is not measuring students at all; it is measuring teachers. Students do not learn more because they are tested more. Students learn more when they are taught more, when classroom instruction improves. The Index measures classroom instruction and shows schools exactly where to improve their instructional process so that students will learn more.

It is therefore a primary object of the present invention to provide an evaluation tool by which educators and administrators can objectively evaluate their educational processes to determine whether they are providing an effective education to students.

It is also a primary object of the present invention to provide methods for evaluating classroom instruction to identify and improve areas where changes may be made to improve instruction for the purpose of improving student achievement.

It is also an important object of the present invention to provide a method for generating, evaluating, and comparing educational curricula to determine whether the curricula is providing instruction at grade level.

Additional objects of the invention will be apparent from the detailed descriptions and the claims herein.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 1 is a description of the components of Explicit Direct Instruction.

Figure 2:
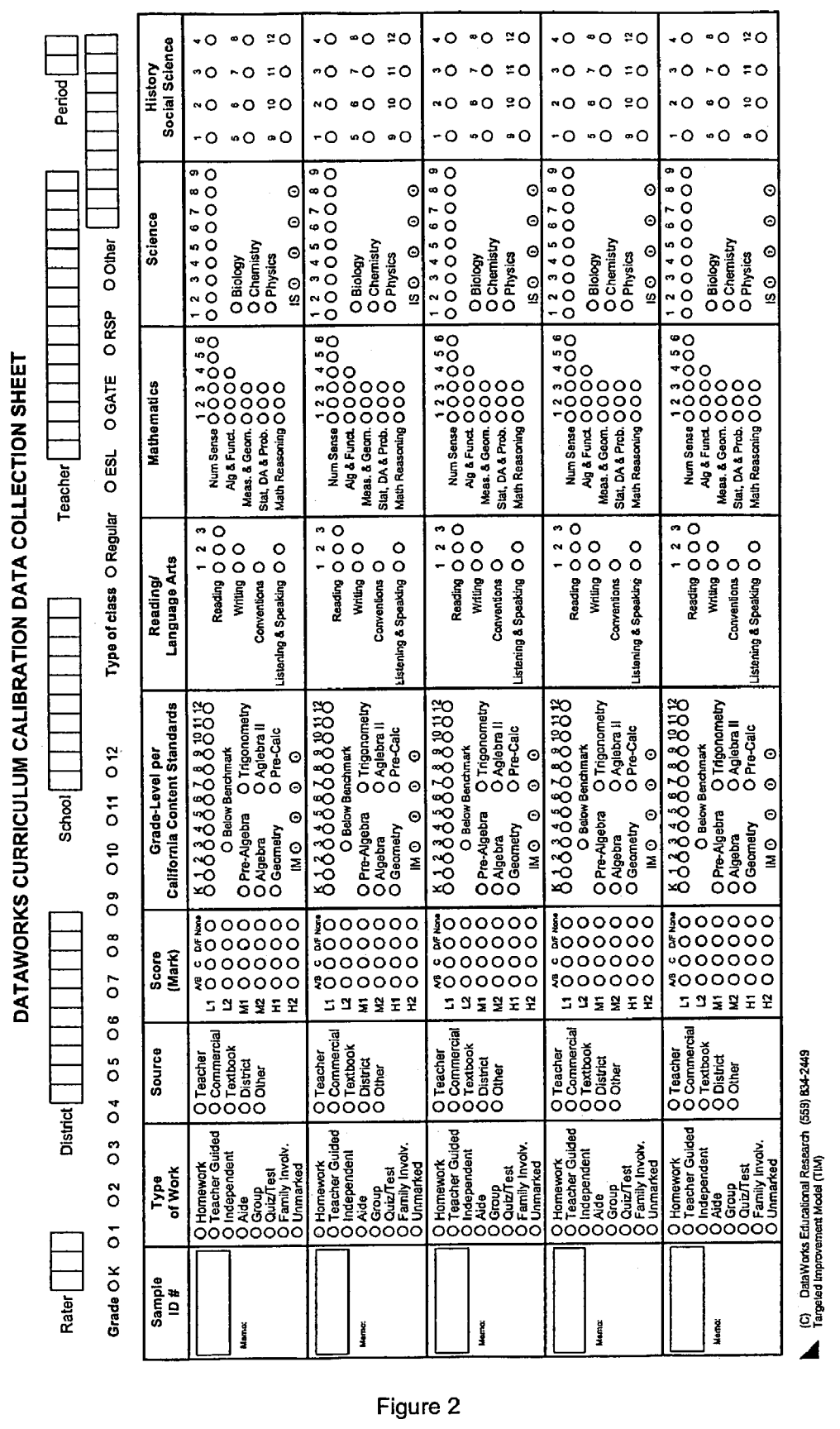

FIG. 2 is a first embodiment of a data collection sheet used to calibrate student assignments for alignment to standards.

FIG. 3 is another embodiment of data collection sheet used to calibrate student assignments for alignment to standards.

FIG. 4 is a first embodiment of a data collection sheet used to collect information from classroom observations.

FIG. 6 is a report showing analysis of the percentage of student assignments aligned to standards for language arts.

FIG. 7 is a report showing the breadth of coverage of the content strands for mathematics.

FIG. 8 is a report showing the Classroom Productivity Index. Note that the report includes the Classroom Productivity Index along with its four components. Alongside the components are goals for each component.

FIG. 9 is a report showing the results of the School Wide Instructional Practices (classroom observations).

FIG. 10 is a set of instructions for collecting student work.

FIGS. 11–28 contain a complete Curriculum Calibration report.

DETAILED DESCRIPTION OF A PREFERRED EMBODIMENT

Figure 5:
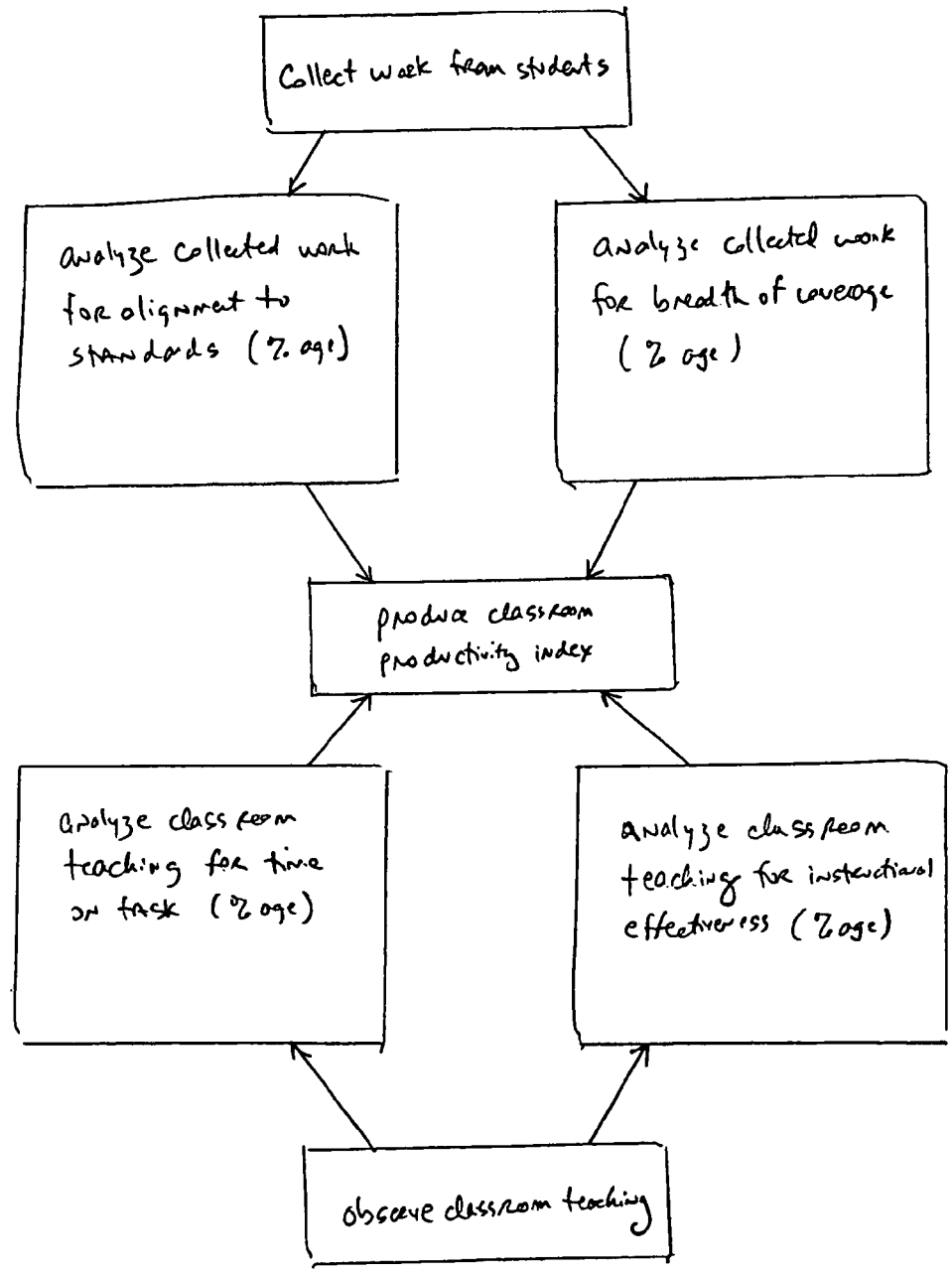
FIG. 5 is a flowchart showing the steps of one embodiment of the method of the present invention.

The Classroom Productivity Index of the present invention is the product of four factors which come from two basic data sources, Curriculum Calibration and the School Wide Instructional Practices Survey (SWIPS). The Index is then used as a measure of the effectiveness of the school's educational program. The Index is computed as a percentage between 0 (totally ineffective classroom teaching) and 100% (all teachers teaching effectively). An Index of 100% would mean that all four components are optimized: All assignments are on grade level matching standards, assignments cover all content areas as tested, all classtime is spent in instruction, and all teachers are using effective Explicit Direct Instruction. Typical Classroom Productivity Index values for schools have been found to range from 3% to about 17% showing wide potential for improved teaching and improved student learning.

The two main factors calculated as a result of Curriculum Calibration are Alignment to Standards and Breadth of Coverage. These are the first two factors of the four used to calculate the Classroom Productivity Index.

Curriculum Calibration is a process for comparing the curriculum that is taught in school classrooms to a given set of grade-level-specific content standards provided by state departments of education. For example, a first grade language arts standard for literary analysis might be "identify and describe the elements of plot, setting, and character(s) in a story, as well as the story's beginning, middle, and ending". A twelfth grade language arts standard for literary analysis might be "evaluate the philosophical, political, religious, ethical, and social influences of the historical period that shaped the characters, plots, and setting". If a twelfth grade student is given an assignment to read *War and Peace* and told to write up the story's beginning, middle, and end, the teacher has actually given an assignment calling for an analysis at a first grade level according to state standards. Note that while first graders cannot read *War and Peace*, the high school students are being assigned to do a first grade level literary analysis. The twelfth graders certainly have not been assigned to "evaluate the philosophical, political, religious, ethical, and social influences of the historical period that shaped the characters, plots, and, setting," a twelfth grade standard.

Computer analysis of the percentage of assignments that are on grade level is used to determine the first component of the Classroom Productivity Index, Alignment to Standards. Typically, assignments start on grade level in kindergarten and slip further below grade level each year to where only about 20% of high school assignments are on grade level. Many high schools are teaching at about the $8^{th}$ grade level. A typical alignment to standards might be 60%. In other words, for a school as a whole, only 60% of the assignments were on grade level.

Breadth of Coverage is the percentage of student assignments that meets the distribution of topic patterns of some objective measure such as a standardized test.

Breadth of Coverage of the standards is determined by calculating the number of assignments in various content areas of the standards as compared to state testing. Typically, the content for mathematics includes five strands: (1) Number Sense, (2) Algebra and Functions, (3) Measurement and Geometry, (4) Statistics, Data Analysis & Probability, and (5) Mathematical Reasoning. These five math strands are taught starting in kindergarten. State departments of education provide detailed information on the percentage of questions tested in each strand. Early grades focus more questions on Number Sense (adding, subtracting, multiplying, and dividing) whereas higher grades place more emphasis on the Algebra and Functions strand. Computer analysis of the number of assignments being taught to students in each strand is compared to published percentages of questions tested from each strand to measure the breadth of coverage of the standards. Typically, breadth of coverage of the standards might be 50%.

The School Wide Instructional Practices Summary (SWIPS) is a process for evaluating the observed instructional practices of classroom teachers. The two main factors calculated as a result of SWIPS are Time on Task and Instructional Effectiveness. These are the other two factors of the four used to calculate the Productivity Index.

Time on Task is the percentage of classroom time when students are effectively engaged in learning. While in the classroom, observers track the number of minutes spent in various classroom activities. Off-task time includes time spent in management and administration, discipline, and transitions. On-task time includes teachers presenting lessons (lesson objective, preview/review, explaining, modeling, demonstrating, checking for understanding, guided practice, and closure), students doing independent seatwork, and students taking tests or quizzes. For the Time on Task measurements, observers do not make judgments of the quality of the activities; they only measure time allocation.

Instructional Effectiveness is the percentage of teachers who match the attributes of effective teachers as defined by the Explicit Direct Instruction Model. Observers tally each Explicit Direct Instruction component as it is presented during the teachers' lessons (lesson objective, preview/review, explaining, modeling, demonstrating, checking for understanding, guided practice, and closure). The Explicit Direct Instruction model has been shown by research to be the most effective and efficient method to teach students, especially low-performing students. Since essentially all school improvement is focused on low-performing students, this model was selected to measure teacher effectiveness. School reform efforts and funding rarely addresses improving the learning of already high-performing students.

Our observations often show that students are assigned seatwork without any teaching: "Read the chapter and answer the questions at the end of the chapter. When you finish the worksheet, come to my desk and I will give you another." Refer to FIG. 4 for an example of the observation form used. Although many, many teaching characteristics are collected and measured, including cognitive strategies, scaffolding, higher order questioning, and room environment, only Explicit Direct Instruction practices are included in teacher effectiveness computation.

The method of the present invention is the creation of a Productivity Index which is the product of the above four factors: the (1) Alignment to Standards percentage multiplied by the (2) Breadth of Coverage percentage, with the resultant multiplied by the (3) Time on Task percentage, with this resultant multiplied by the (4) Instructional Effectiveness percentage. The final resultant is the Classroom Productivity Index. For example, a typical school might have components as follows: Time on Task 85%, Alignment to Standards 61%, Breadth of Coverage of Standards 56%, Instructional Effectiveness 57%. These multiply together to yield an Index of 17% ($0.85 \times 0.61 \times 0.56 \times 0.57 = 0.17$). It is important to understand that these four factors multiply together because they are independent variables. For example, a teacher can use effective instructional practices, have a high alignment with the standards, and yet have a Time on Task of only 75%. In this case, although students are receiving effective instruction, 25% or one-fourth of the time is lost. By $12^{th}$ grade, students will only have received nine years of instruction. As another example, a teacher can have a very high time on task yet be teaching off grade level, not matching content standards. In this case, the material being taught does not match what the student should be learning and does not match what the student will be tested on during state testing. This example shows the usefulness of the Index as a measurement of the school's skill in teaching students and preparing them for state tests.

The Curriculum Calibration process (which leads to the development of the Alignment to Standards and Breadth of Coverage factors) has four steps: (1) collection, (2) analysis, (3) processing, and (4) presentation. In the collection step, classroom teachers collect actual student work. They are not allowed to select work, but must submit all work from selected students. See FIG. 10 for instructions given to teachers for student work collection.

Figure 3:
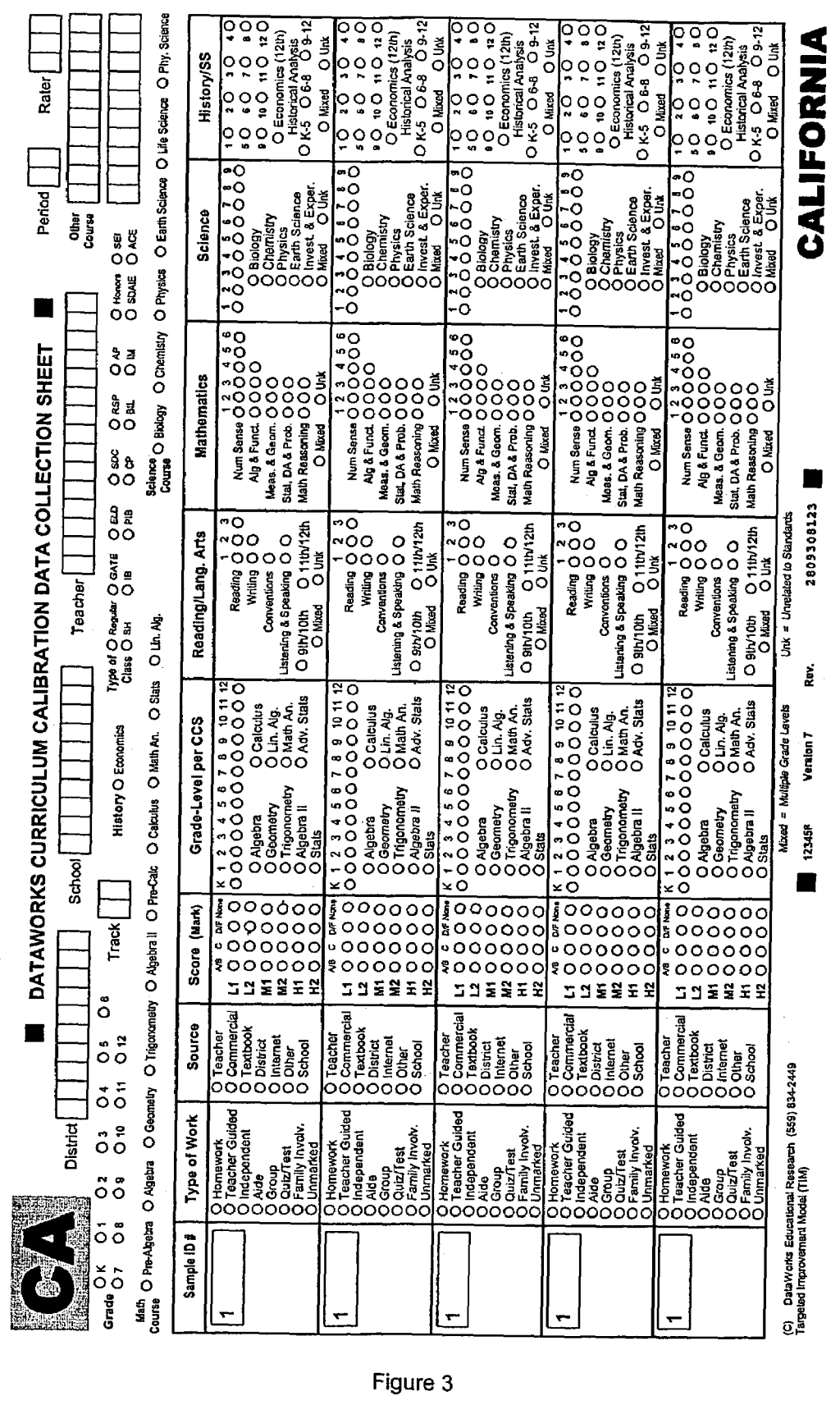

In the second step, analysis, trained calibrators look at each assignment and compare it to state content standards to see where the assignment falls in the standards. Calibrators have copies of the standards and computerized searchable copies of the standards to refer to. During training, calibrators are shown how to find a specific standard that matches the assignment. They are also trained in the subtleties of the standards, including the difference between student skills of identifying, describing, or analyzing. The calibration information is collected on scannable data sheets. See FIG. 3 for a sample scannable calibration data collection sheet. Note that besides indicating the grade level and strand being taught on the worksheet, information is collected for the source of work (textbook, teacher created, commercial worksheet, etc.), the type of work (independent work, tests or quizzes, guided practice, etc.), and the students' mark (A, B, C, D, F) on the assignment. These additional factors are not included in the calculation of the Classroom Productivity Index itself but are additional useful information for the teachers and administrators to use and understand in order to improve the instructional processes at a school.

During calibration processing, step 3, the bubble-in sheets are machine read via an optical scanner using computer software which extracts the recorded information and creates a data base containing all of the calibration data recorded for each student work sample, which is linked to specific classroom teachers, grade levels and school sites. Custom written software then analyzes the calibration data and determines the percentage of assignments that were on grade level (Alignment to Standards) and the percentage of assignments in each content strand (Breadth of Coverage). In addition, much additional information is generated to help the school improve such as: disaggregations; class types such as regular, remedial, and advanced; source of work assignments; type of work; and student grades (marks).

Figure 14:
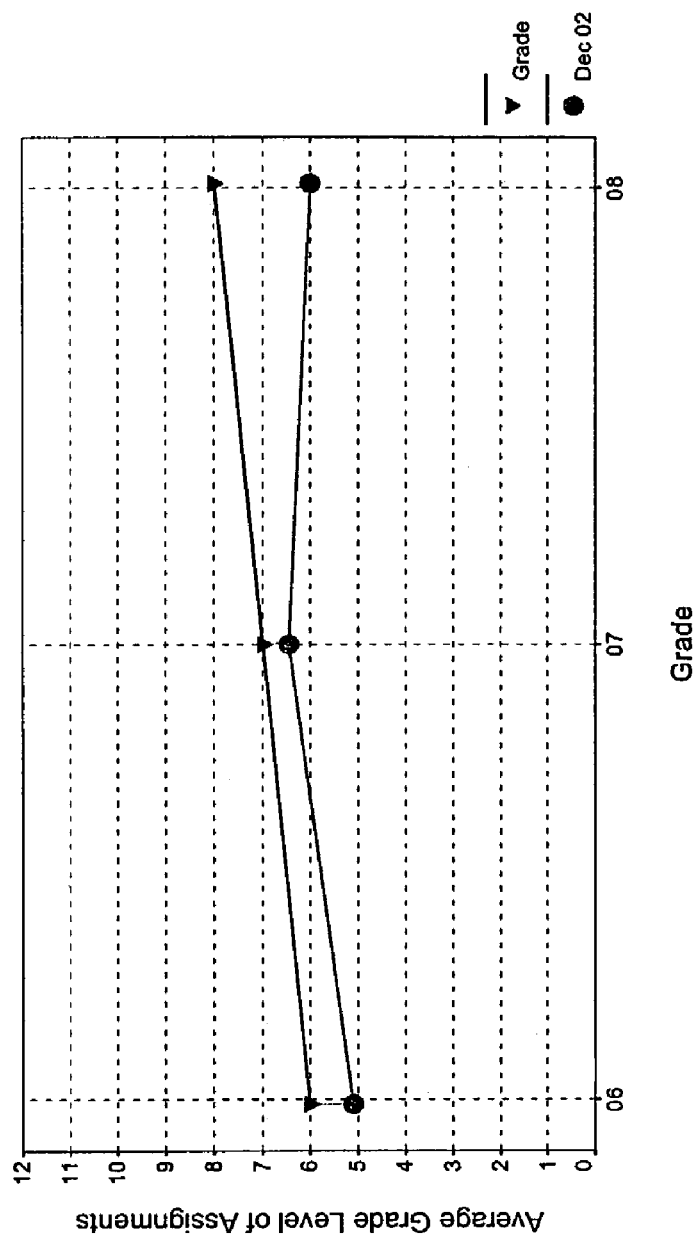
Figure 19:
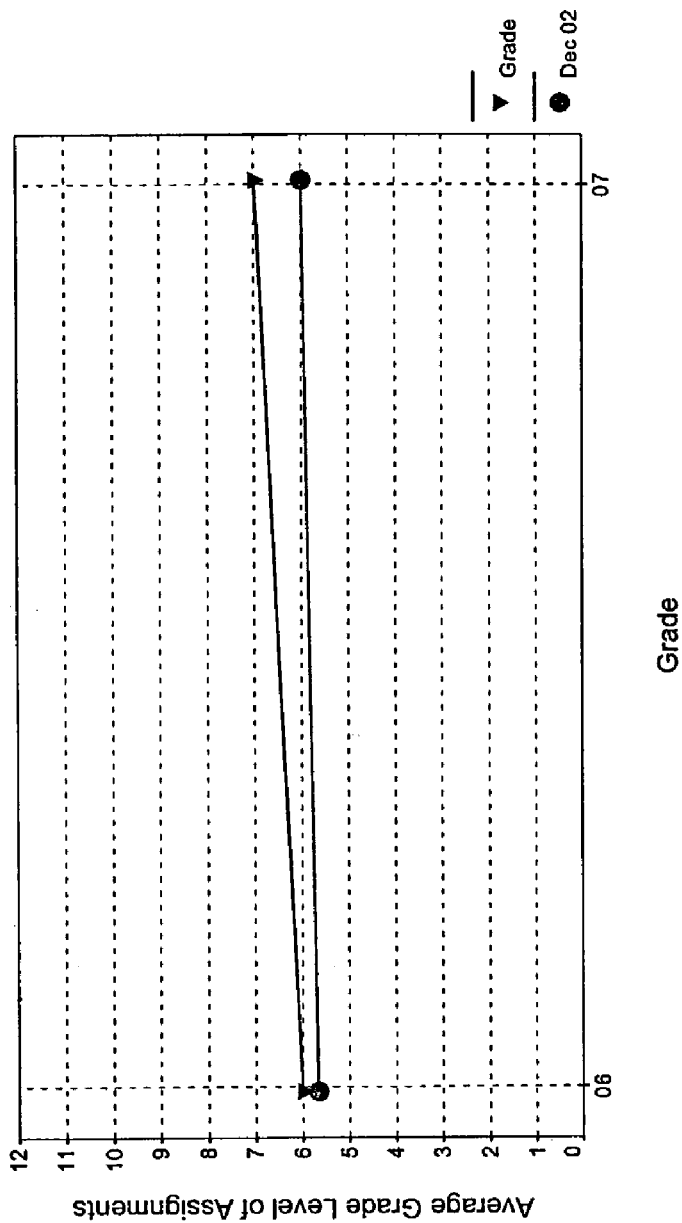

In the presentation step, Calibration reports are created and printed showing the Alignment to Standards and Breadth of Coverage (two of the factors used to calculate the Productivity Index). (See FIG. 6 and FIG. 7.) Reports are created and printed showing other collected data in various aggregated and disaggregated comparison formats as well. These results are presented to school personnel. A complete Curriculum Calibration report is shown in FIG. 11 to FIG. 28.

The School Wide Instructional Practices Survey or SWIPS process (which leads to the development of the Time on Task and Instructional Effectiveness factors) has three steps: observation, processing and presentation. In the observation step, specially trained observers visit classrooms to record student and teacher behaviors. These are one-hour observations in which a large amount of teacher behaviors can be recorded. While principals often do classroom walk-throughs lasting only two to three minutes, the SWIPS process requires long observations periods for each teacher. Short observations do not allow enough time to observe more that one or two teacher practices and cannot be used. The observers record the amount of time during each classroom observation period in which students are effectively engaged in learning. The observers record the information regarding the classroom observations filling in bubbles on machine-readable bubble-in worksheets. See FIG. 4 for an example of the observation form. The information on Explicit Direct Instruction components is used in the calculation of Instructional Effectiveness. Experience and research has shown that an effective teacher can implement about six practices during an observation period. The percentage of teachers using at least six Explicit Direct Instruction components is used to calculate the Instructional Effectiveness of a school.

In the processing step for observations, the bubble-in sheets are machine read via an optical scanner using computer software which extracts the recorded information and creates a data base containing all of the observable data recorded for each classroom observation.

Figure 9:
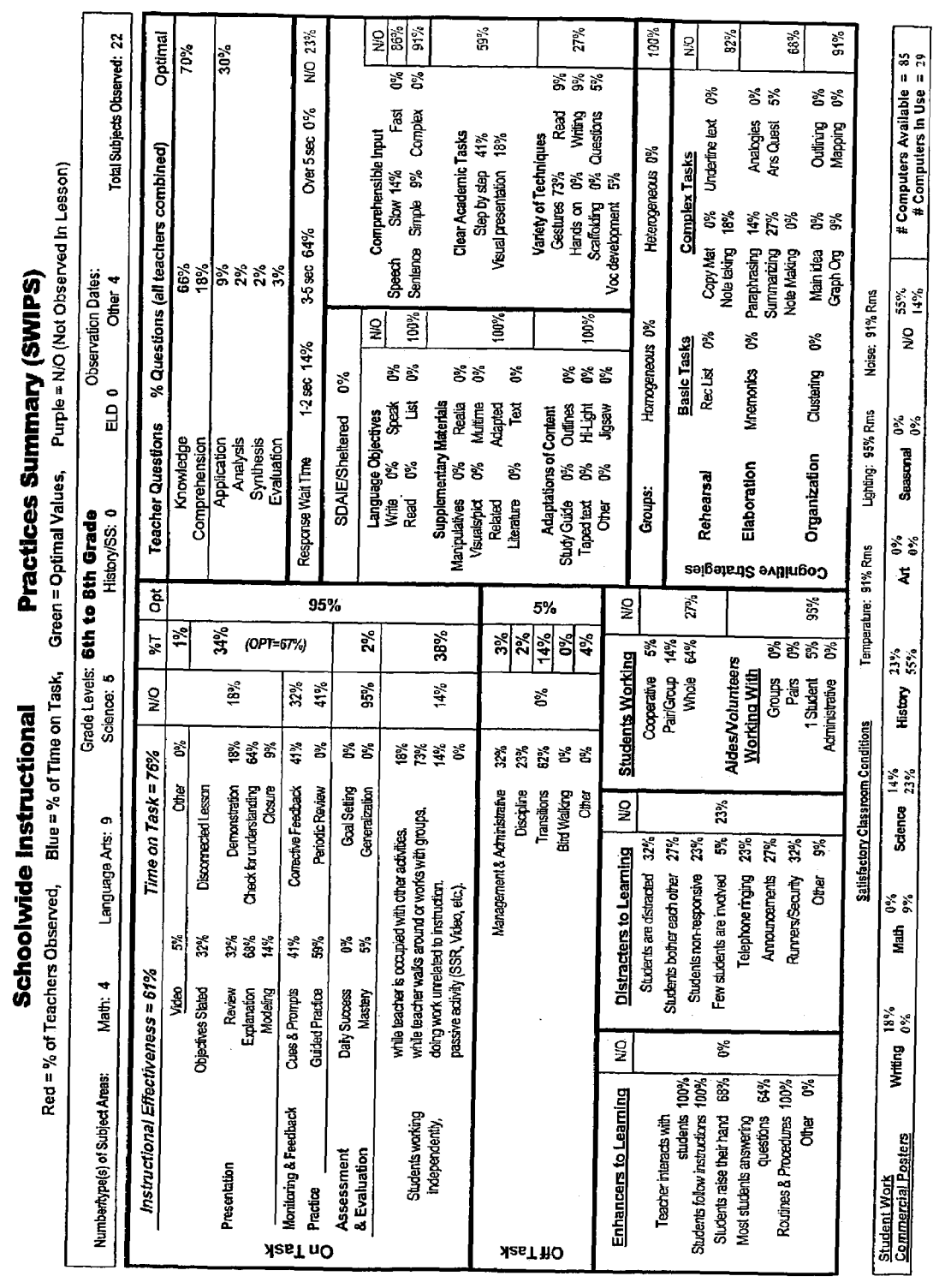

In the presentation step for the observations, a report is created and printed using custom software showing the composite Time on Task and Instructional Effectiveness for the school as a whole. Other instructional factors are collected and analyzed but are not specifically included in the Index. See FIG. 9 for a sample completed School Wide Instructional Practices Summary report.

Finally, the data from the Curriculum Calibration and School Wide Instructional Practices Summary is used to calculate the Classroom Productivity Index. A report is prepared and presented to school administrators and teachers explaining and showing the calculation of the four factors (Alignment to Standards, Breadth of Coverage, Time on Task, and Instructional Effectiveness) and the resultant Classroom Productivity Index along with the implications of the effect of changes in the Index on student academic achievement. Goals for each of the four components are presented along with additional information learned from the calibration and observations. See FIG. 8 for a sample Classroom Productivity Index report.

The Classroom Productivity Index focuses schools on improvements that will specifically help students. Consider that a school with a Productivity Index of 3% might have been considering lengthening the school year for additional learning. If this school adds 10 days to a 180-day schedule, the learning opportunity has been increased by 6%. This is not much of an improvement. The school would be much better off raising its Classroom Productivity for the existing instructional days rather than add more at a low level of effectiveness.

Goals have been determined for each component as follows: Time on Task 95%, Alignment to Standards 90%, Breadth of Coverage 90%, and Instructional Effectiveness 90%. These components when multiplied together produce an Index goal of 69% (0.95×0.90×0.90×0.90=0.69). With an existing Index of 3%, a school has the potential for improvement of 2300% (69%/3%).

It is to be appreciated that numerous different combinations of the various components of the present system may be utilized to accomplish the desired Index. The Index could be modified for weighting factors of the four components. Currently, each factor has a weighting factor of one. Additional experience may show that weighting the four factors differently may more accurately measure the relative importance of each. Also, additional instructional factors collected during the classroom observations could be included, such as cognitive strategies or use of higher order questions. Currently, only the use of Explicit Direct Instruction is included in the measurement of Instructional Effectiveness. Also, additional factors from the Curriculum Calibration such as source of assignments could be included. Presently, only Alignment to Standards and Breadth of Coverage are used.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A method for generating an index for use in evaluating the effectiveness of an educational institution comprising the steps of:
   a. collecting work from students at the institution;
   b. analyzing the collected student work to determine its alignment to standards and expressing this as a percentage;
   c. analyzing the collected student work to determine its breadth of coverage and expressing this as a percentage;
   d. observing the classroom teaching of students at the institution;
   e. analyzing the observed teaching to determine time on task and expressing this as a percentage;
   f. analyzing the observed teaching to determine instructional effectiveness and expressing this as a percentage;
   g. multiplying together the four percentages of alignment to standards, breadth of coverage, time on task and instructional effectiveness to produce an index value; and h. comparing the produced index value to a norm by a computer, and producing a report comparing the produced index value to the norm for evaluation purpose.

2. The method of claim 1 comprising the additional step of reporting the four percentages and the index value, to the educational institution.

3. The method of claim 2 comprising the additional step of developing strategies for improving any of the four percentages.

4. The method of claim 2 comprising the additional steps of:
  j performing a curriculum calibration of the collected student work;
  k. preparing a school wide instructional practices summary of the classroom observations; and
  l. reporting the results of the curriculum calibration and school wide instructional practices summary to the educational institution.

5. The method of claim 4 comprising the additional step of developing strategies for improvement.

6. The method of claim 1 wherein the alignment to standards is determined as a percentage of assignments given to students that are on grade level.

7. The method of claim 6 wherein the breadth of coverage is determined as a percentage of coverage of each content strand as compared to the percentage of questions per content strand tested on state assessments.

8. The method of claim 7 wherein the instructional effectiveness is determined as a percentage of teacher time using explicit direct instruction.

9. The method of claim 7 wherein the classroom observation is performed by specially trained observers who record student and teacher behaviors for long periods of time.

10. The method of claim 9 wherein each classroom observation takes place for at least one hour.

11. The method of claim 1 Wherein different weights are given to each of the four percentages based on their relative importance.

12. A method for creating an index reflecting the effectiveness of an educational institution comprising the steps of:
  a. observing student-teacher classroom instruction at the institution;
  b. recording observations onto first data collection sheets;
  c. obtaining work from students at the institution;
  d. categorizing the work according to grade level, and recording such categorizations onto second data collection sheets;
  e. categorizing the work according to distribution of educational subject areas, and recording such categorizations onto third data collection sheets;
  e. entering information recorded on the first, second and third data collection sheets into a computer, and using said computer to determine:
    (1) the percentage of work that meets grade level standards,
    (2) the percentage of work that meets an established distribution of educational subject areas,
    (3) the percentage of time that students are effective engaged in learning, and
    (4) the percentage of time of teacher effectiveness based on a direct instruction model; and
  f. multiplying the above four percentages together to produce an index value;
  (g) producing a report by the computer by comparing the index value to a norm for evaluation purpose.

13. The method of claim 12 wherein the report is used to determine overall educational efficiency of the institution.

14. The method of claim 13 wherein the index is used to improve the effectiveness of teaching at the institution.

15. A method for generating an index showing the effectiveness of an educational institution comprising the steps of:
  a. collecting work generated by students at the institution;
  b. determining the amount of the collected work that meets grade-level standards, expressed as a percentage of the collected work;
  c. determining the amount of the collected work that meets an established distribution of educational subject areas, expressed as a percentage of the collected work;
  d. observing the classroom instruction of students by at least one teacher at the institution for a time period;
  e. determining the amount of time that the observed students are effectively engaged in learning, expressed as a percentage of the time period;
  f. determining the amount of time that the at least one teacher is matching the attributes of effective teachers as defined by a direct instruction model, expressed as a percentage of the time period; and
  g. multiplying together the four percentages produced in steps b, c, e and f to produce an educational effectiveness index;
  (h) producing a report by a computer by comparing the index to a norm for evaluation purpose.

* * * * *